United States Patent
Shuck et al.

(10) Patent No.: US 10,406,760 B2
(45) Date of Patent: Sep. 10, 2019

(54) NEURO-FUZZY LOGIC FOR CONTROLLING MATERIAL ADDITION PROCESSES

(71) Applicant: Rolls-Royce Corporation, Indianapolis, IN (US)

(72) Inventors: Quinlan Yee Shuck, Indianapolis, IN (US); Kong Ma, Carmel, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 557 days.

(21) Appl. No.: 14/988,368

(22) Filed: Jan. 5, 2016

(65) Prior Publication Data
US 2016/0193790 A1    Jul. 7, 2016

Related U.S. Application Data

(60) Provisional application No. 62/100,181, filed on Jan. 6, 2015.

(51) Int. Cl.
*B29C 67/00* (2017.01)
*G05B 19/4099* (2006.01)
(Continued)

(52) U.S. Cl.
CPC ........ *B29C 67/0088* (2013.01); *B22F 3/1055* (2013.01); *B22F 5/009* (2013.01);
(Continued)

(58) Field of Classification Search
CPC ...... B22F 2003/1056; B22F 2003/1057; B22F 2999/00; B22F 2201/10; B22F 2203/03;
(Continued)

(56) References Cited

U.S. PATENT DOCUMENTS 6,553,275 B1    4/2003    Mazumder
7,043,330 B2 *  5/2006    Toyserkani .......... B23K 26/032
                                                     219/121.6
(Continued)

OTHER PUBLICATIONS

Jang et al., "Neuro-Fuzzy Modeling and Control," Proceedings of the IEEE vol. 83, No. 3, Mar. 1995, 29 pp.
(Continued)

*Primary Examiner* — Abdelmoniem I Elamin
(74) *Attorney, Agent, or Firm* — Shumaker & Sieffert, P.A.

(57) ABSTRACT

A method may include controlling, by a computing device, a directed energy deposition material addition (DED MA) technique based at least in part on a thermal model. The thermal model may define a plurality of default operating parameters for the DED MA technique. The method also may include detecting, by at least one sensor, at least one parameter related to the DED MA technique. Further, the method may include, responsive to determining, by the computing device, that a value of the at least one detected parameter is different from an expected value of a corresponding parameter predicted by the thermal model, determining, by the computing device and using a neuro-fuzzy algorithm, an updated value for at least one operating parameter for the DED MA technique, and controlling, by the computing device, the DED MA technique based at least in part on the updated value.

16 Claims, 5 Drawing Sheets

(51) Int. Cl.

| | | |
|---|---|---|
| *B33Y 50/02* | (2015.01) | |
| *B23K 15/00* | (2006.01) | |
| *B23K 26/342* | (2014.01) | |
| *G05B 19/404* | (2006.01) | |
| *B22F 3/105* | (2006.01) | |
| *B22F 5/00* | (2006.01) | |
| *B22F 5/04* | (2006.01) | |
| *B33Y 10/00* | (2015.01) | |
| *B33Y 30/00* | (2015.01) | |
| *B29C 64/386* | (2017.01) | |

(52) U.S. Cl.
CPC ............ *B22F 5/04* (2013.01); *B23K 15/0086* (2013.01); *B23K 26/342* (2015.10); *B29C 64/386* (2017.08); *B33Y 10/00* (2014.12); *B33Y 30/00* (2014.12); *B33Y 50/02* (2014.12); *G05B 19/404* (2013.01); *G05B 19/4099* (2013.01); *B22F 2003/1056* (2013.01); *B22F 2003/1057* (2013.01); *B22F 2999/00* (2013.01); *G05B 2219/34066* (2013.01); *G05B 2219/35134* (2013.01); *G05B 2219/42085* (2013.01); *G05B 2219/49007* (2013.01); *G05B 2219/49027* (2013.01); *Y02P 10/295* (2015.11)

(58) Field of Classification Search
CPC .... B22F 2203/11; B22F 3/1055; B22F 5/009; B22F 5/04; B23K 15/0086; B23K 26/342; B29C 64/386; B29C 67/0088; B33Y 10/00; B33Y 30/00; B33Y 50/02; G05B 19/404; G05B 19/4099; G05B 2219/34066; G05B 2219/35134; G05B 2219/42085; G05B 2219/49007; G05B 2219/49027; Y02P 10/295

See application file for complete search history.

(56) References Cited

U.S. PATENT DOCUMENTS

| | | | |
|---|---|---|---|
| 7,286,893 B1 | 10/2007 | Mazumder | |
| 7,423,236 B2 * | 9/2008 | Suh ..................... | B23K 26/032 219/121.64 |
| 7,704,565 B2 | 4/2010 | Slaughter | |
| 7,765,022 B2 | 7/2010 | Mazumder et al. | |
| 8,383,985 B2 | 2/2013 | Twelves, Jr. et al. | |
| 8,452,073 B2 | 5/2013 | Taminger et al. | |
| 8,629,368 B2 | 1/2014 | Mazumder et al. | |
| 9,044,827 B2 * | 6/2015 | Song ..................... | B23K 26/03 |
| 9,355,441 B2 * | 5/2016 | Wersborg ............. | B23K 1/0056 |
| 2004/0133298 A1 | 7/2004 | Toyserkani et al. | |
| 2006/0054079 A1 | 3/2006 | Withey et al. | |
| 2008/0314878 A1 * | 12/2008 | Cai ....................... | B22F 3/1055 219/121.62 |
| 2009/0024243 A1 * | 1/2009 | Suh ..................... | B23K 26/032 700/119 |
| 2011/0061591 A1 | 3/2011 | Stecker | |
| 2013/0178952 A1 * | 7/2013 | Wersborg ............. | B23K 1/0056 700/47 |
| 2013/0228560 A1 | 9/2013 | Ume et al. | |
| 2014/0163717 A1 | 6/2014 | Das et al. | |

OTHER PUBLICATIONS

Response to Extended Search Report dated Jun. 17, 2016, from counterpart European Application No. 16150297.6, filed Jan. 9, 2017, 9 pp.

Extended European Search Report from counterpart European Application No. 16150297.6, dated Jun. 17, 2016, 7 pp.

Response to Examination Report dated Jul. 12, 2017 , from counterpart European Application No. 16150297.6, filed Nov. 7, 2017, 10 pp.

Examination Report from counterpart European Application No. 16150297.6, dated Jul. 12, 2017, 5 pp.

Examination Report from counterpart European Application No. 16150297.6, dated Jul. 19, 2018, 4 pp.

Rule 71(3) EPC Communication from counterpart European application 16150297.6, dated Apr. 12, 2018, 39 pgs.

Response to Examination Report dated Jul. 19, 2018, from counterpart European Application No. 16150297.6, filed Nov. 13, 2018, 14 pp.

Intent to Grant dated Dec. 11, 2018, from counterpart European Application No. 16150297.6, 39 pp.

* cited by examiner

NEURO-FUZZY LOGIC FOR CONTROLLING MATERIAL ADDITION PROCESSES

This application claims the benefit of U.S. Provisional Application No. 62/100,181 filed Jan. 6, 2015, which is incorporated herein by reference in its entirety.

TECHNICAL FIELD

The present disclosure generally relates to material addition techniques.

BACKGROUND

Integrally bladed disks, which may be called blisks, are used in low-pressure compressor (LPC) and high-pressure compressor (HPC) stages of gas turbine engines. The blisks may weigh less and have lower leakage than separate blades and disks, facilitating gas turbine engine efficiency. In some examples, multiple blisks may be metallurgically bonded or welded together to make blisk drums. Although this may further reduce component weight compared to separate blisks mechanically attached to each other, it increases manufacturing and repair costs.

SUMMARY

In some examples, the disclosure describes a method that includes controlling, by a computing device, a directed energy deposition material addition (DED MA) technique based at least in part on a thermal model of the DED MA technique for a component. The thermal model may define a plurality of default operating parameters for the DED MA technique. The method also may include detecting, by at least one sensor, at least one parameter related to the DED MA technique. Further, the method may include, responsive to determining, by the computing device, that a value of the at least one detected parameter is different from an expected value of a corresponding parameter predicted by the thermal model, determining, by the computing device and using a neuro-fuzzy algorithm, an updated value for at least one operating parameter for the DED MA technique. The method additionally may include controlling, by the computing device, the DED MA technique based at least in part on the updated value for the at least one operating parameter.

In some examples, the disclosure described a directed DED MA system including a material delivery device, an energy source, an energy delivery head, at least one sensor, and a computing device. The computing device may be configured to control at least one of the material delivery device, the energy source, and the energy delivery head based at least in part on a thermal model of the DED MA technique for a component. The thermal model may define a plurality of default operating parameters for the DED MA technique. The computing device also may be configured to receive, from the at least one sensor, a signal indicative of at least one parameter related to the DED MA technique, and, responsive to determining that a value of the at least one detected parameter is different from an expected value of a corresponding parameter predicted by the thermal model, determine, using a neuro-fuzzy algorithm, an updated value for at least one operating parameter for the DED MA technique. Further, the computing device may be configured to control at least one of the material delivery device, the energy source, and the energy delivery head based at least in part on the updated value for the at least one operating parameter.

In some examples, the disclosure describes a computer-readable storage medium including instructions, that, when executed, cause at least one processor to control a DED MA technique based at least in part on a thermal model of the DED MA technique for a component. The thermal model may define a plurality of default operating parameters for the DED MA technique. The computer-readable storage medium also may include instructions, that, when executed, cause the at least one processor to receive, from the at least one sensor, a signal indicative of at least one parameter related to the DED MA technique, and, responsive to determining that a value of the at least one detected parameter is different from an expected value of a corresponding parameter predicted by the thermal model, determine, using a neuro-fuzzy algorithm, an updated value for at least one operating parameter for the DED MA technique. Further, the computer-readable storage medium may include instructions, that, when executed, cause at least one processor to control the DED MA technique based at least in part on the updated value for the at least one operating parameter.

The details of one or more examples are set forth in the accompanying drawings and the description below. Other features, objects, and advantages will be apparent from the description and drawings, and from the claims.

DETAILED DESCRIPTION

Figure 1:
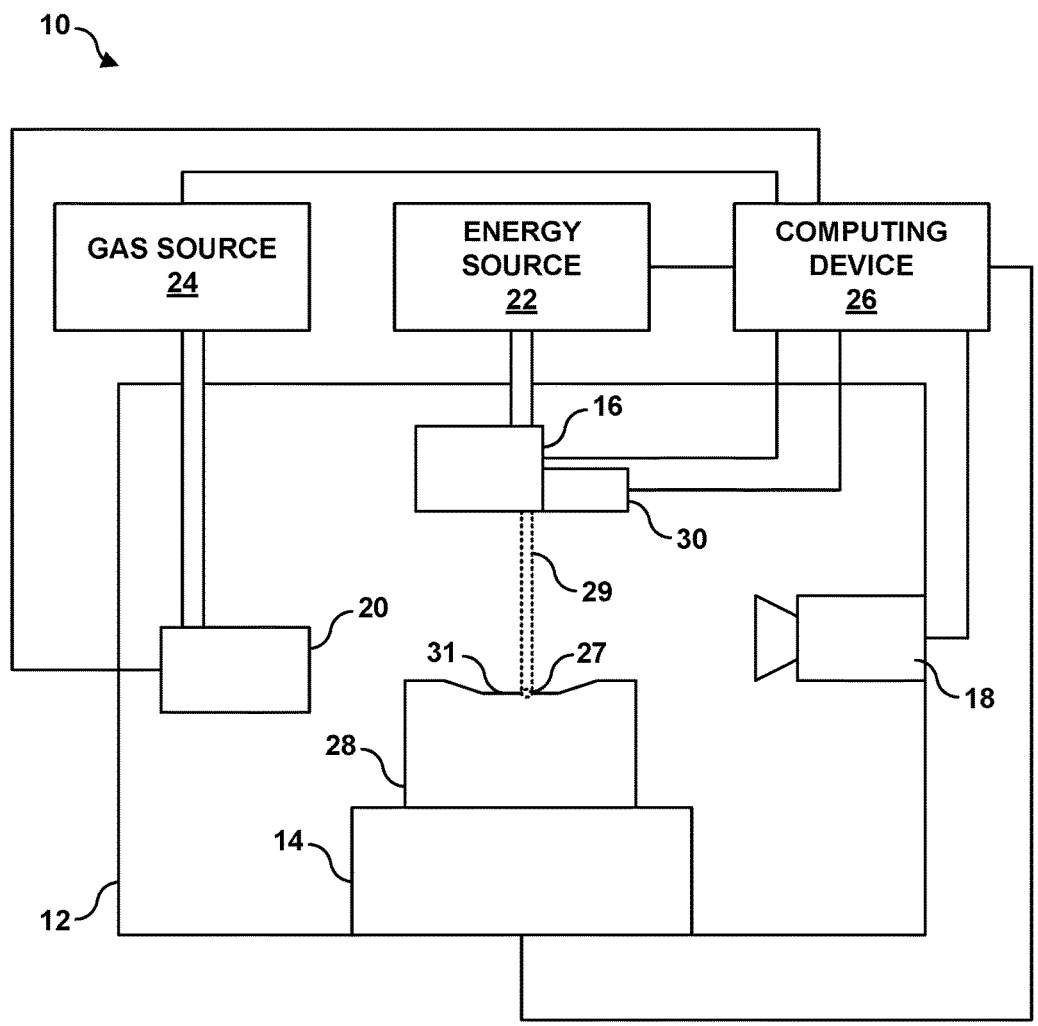
FIG. 1 is a conceptual block diagram illustrating an example system for forming a component or repairing a damaged component using directed energy deposit material addition.

The disclosure describes systems and techniques for controlling material addition processes. In some examples, directed energy deposit (DED) material addition (MA) may be used to deposit at least one layer of material on a component to form a component or repair a damaged portion of the component. The systems and techniques described herein may control the DED MA techniques based on a thermal model. The thermal model may define a plurality of default operating parameters for the DED MA technique. The systems and techniques described herein may monitor at least one parameter of the DED MA technique, such as a parameter related to a melt pool formed at the location where material is being added to the component or a geometry of the component. Responsive to determining that a value of at least one parameter is different than the value predicted by the thermal model, the systems and techniques may utilize a neuro-fuzzy algorithm to determine an updated value for at least one operating parameter for the DED MA technique. The operating parameters may relate to energy delivery, material delivery, movement between the energy delivery head and the component, a flow of a cooling gas, or the like. The systems and techniques described herein then may control the DED MA technique based at least in part on the updated value determined using the neuro-fuzzy algorithm.

The thermal model may define an expected set of outputs based on specified inputs and theoretical or experimentally determined relationships between inputs and outputs. For example, the thermal model may define an expected melt pool geometry, melt pool temperature, component temperature, and material addition rate for a specified set of inputs, such as operating parameters including material flow rate, energy source power level, cooling gas flow rate, and focal spot movement rate relative to the component. However, thermal models may be computationally expensive, such that the thermal model may not be practical for real-time control of the DED MA technique. Hence, thermal models may provide satisfactory baseline or default operating parameters for the DED MA.

Because of this, the techniques described herein use a neuro-fuzzy algorithm to determine updated operating parameters responsive to determining that the value of one or more detected parameters (e.g., melt pool geometry, component temperature, component geometry, or the like) deviates from the value predicted by the thermal model. The neuro-fuzzy algorithm may generate control rules, which may allow a user, such as a technician, to evaluate the control rules. Further, the neuro-fuzzy algorithm includes one or more node parameters that may be determined during training of the neuro-fuzzy algorithm using a training data set. In some examples, the one or more node parameters may be updated periodically or continuously during operation of the neuro-fuzzy algorithm, which may allow the control provided by the neuro-fuzzy algorithm to improve. The neuro-fuzzy algorithm then may be used for real-time control of the DED MA process.

FIG. 1 is a conceptual diagram illustrating an example system 10 for forming a component or repairing a damaged component using DED MA. The example system 10 illustrated in FIG. 1 includes an enclosure 12, which encloses a stage 14, an energy delivery head 16, at least one sensor 18, a gas delivery device 20, and a material delivery device 30. System 10 also includes an energy source 22, which is operatively coupled to energy delivery head 16 and a gas source 24, which is fluidly connected to gas delivery device 20. In the example of FIG. 1, system 10 further includes a computing device 26, which is communicatively connected to energy source 22, gas source 24, gas delivery device 20, energy delivery head 16, at least one sensor 18, stage 14, and material delivery device 30.

Figure 2:
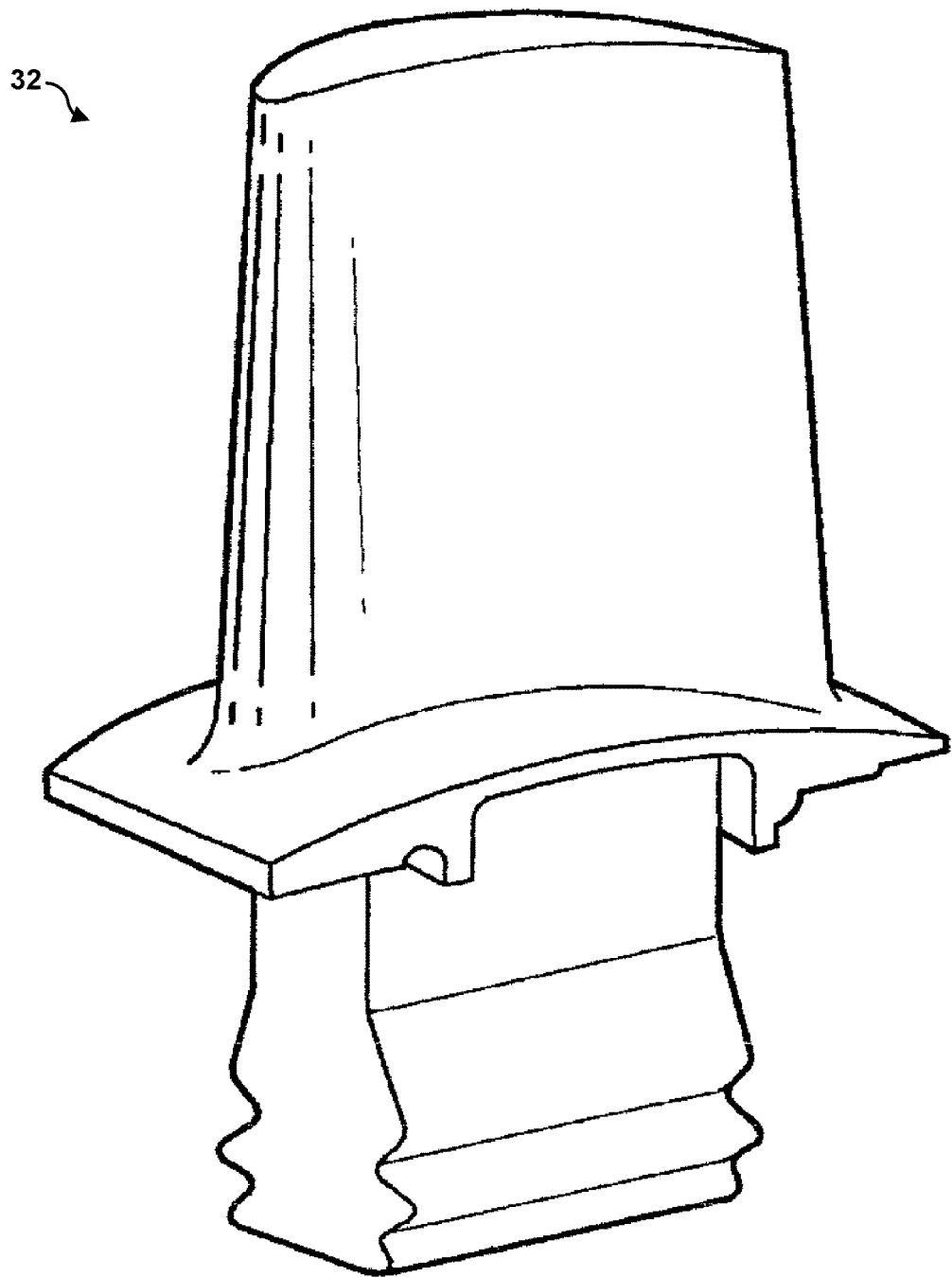
FIG. 2 is a conceptual diagram illustrating an example gas turbine blade.
Figure 3:
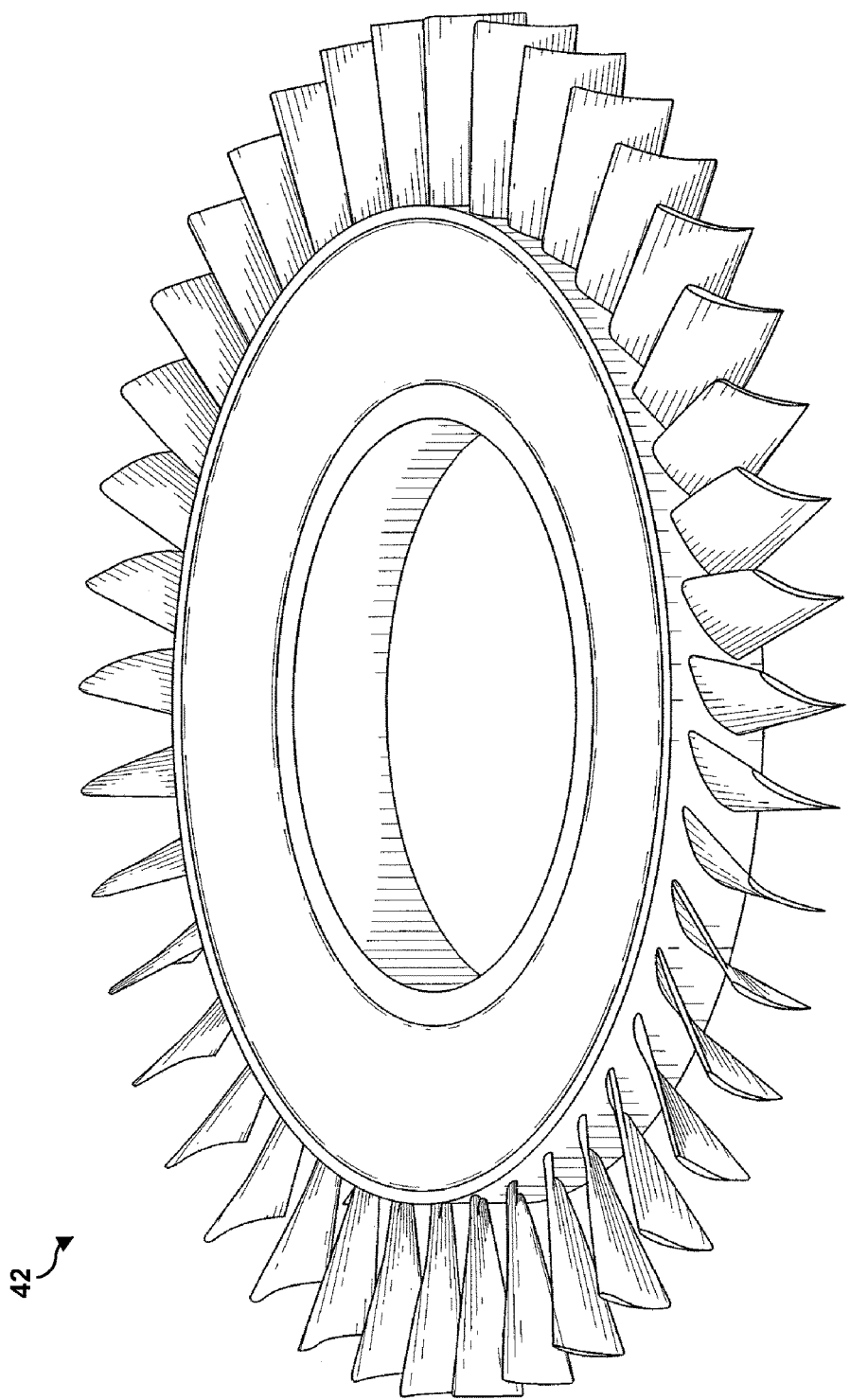
FIG. 3 is a schematic and conceptual diagram illustrating an example gas turbine blisk.

In some examples, component 28 may include a component of a gas turbine engine. For example, component 28 may include a part that forms a portion of a flow path structure or another portion of the gas turbine engine. For example, FIG. 2 is a conceptual diagram illustrating an example component 28, which is in the form of a turbine blade 32. In other examples, component 28 can take on a variety of other forms. As another example, FIG. 3 is a conceptual diagram illustrating an example component 28, which is in the form of a gas turbine engine blisk 42.

Component 28 may be formed of materials including metals and alloys, alone, or with one or more metallic, alloy, or ceramic coatings. In some examples, component 28 may include a titanium alloy or a nickel alloy. Example alloys include Ti-6Al-4V, Ti-6Al-2Sn-4Zr-2Mo, Ti-6Al-2Sn-4Zn-6Mo, and Inconel 718, an alloy including about (by mass) 50-55% Ni, about 17-21% Cr, about 2.8-3.3% Mo, about 4.75-5.5% Nb, about 1% Co, about 0.35% Mn, about 0.2-0.8% Cu, about 0.65-1.15% Al, about 0.3% Ti, about 0.35% Si, about 0.08% C, about 0.015% S, about 0.015% P, about 0.006% B, and a balance Fe.

Returning to FIG. 1, enclosure 12 may substantially enclose (e.g., enclose or nearly enclose) stage 14, energy delivery head 16, at least one sensor 18, gas delivery device 20, component 28, and material delivery device 30. In some examples, enclosure 12 may contain a substantially inert atmosphere (e.g., helium, argon, or the like) during operation of system 10.

In some examples, stage 14 may be configured to selectively position and restrain component 28 in place relative to stage 14 during formation or repair of component 28. In some examples, stage 14 is movable relative to energy delivery head 16, gas delivery device 20, at least one sensor 18, and/or material delivery device 30. For example, stage 14 may be translatable and/or rotatable along at least one axis (e.g., using a 5 axis motion system) to position component 28 relative to energy delivery head 16, gas delivery device 20, and/or at least one sensor 18. Similarly, in some examples, at least one of energy delivery head 16, gas delivery device 20, and/or at least one sensor 18 may be movable relative to stage 14 to position the at least one of energy delivery head 16, gas delivery device 20, and/or at least one sensor 18 relative to component 28. In some examples, as illustrated in FIG. 1, energy delivery head 16 may be coupled (e.g., mechanically attached) to material delivery device 30, such that positioning energy delivery head 16 relative to stage 14 also positions material delivery device 30 relative to stage 14.

Energy source 22 may include, for example, a laser source, such as a CO laser, a $CO_2$ laser, a Nd:YAG laser, or the like. Energy source 22 may be selected to provide energy with a predetermined wavelength or wavelength spectrum that may be absorbed by the material to be added to component 28 during DED MA formation or repair of component 28. Energy source 22 may be operatively connected to energy delivery head 16, which aims an energy beam 29 toward material addition surface 31 of component 28 during formation or repair of component 28. As described above, in some examples, energy delivery head 16 may be movable in at least one dimension (e.g., translatable and/or rotatable) under control of computing device 26 to direct the focal spot 27 of energy beam 29 toward a selected location of component 28. In some examples, the movement of energy delivery head 16 and/or stage 14 may also control the angle of energy beam 18 relative to material addition surface 31.

In some examples, energy delivery head 16 may define a relatively small size in at least one dimension. In some examples, component 28 may be relatively small and/or may define a complex shape with relatively small spacing between adjacent structures. For example, a gas turbine blisk may include a plurality of blades with a spacing of less than 1.0 inch (2.54 cm). Hence, in some examples, the energy delivery head 16 may be sufficiently small to allow head 16 to be positioned to direct focal spot 27 toward portions of a component 28 that is small or that has structural features that result in small working spaces between the structural features.

Computing device 26 may control at least one of the power level of energy source 22, the focal spot size of the energy beam delivered adjacent to material addition surface 31 of component 28, the relative movement of the focal spot 27 of the energy beam 29 relative to component 28, a pause time between bursts of energy, the standoff between the focal point and material addition surface 31 of component 28, the angle of energy beam 18 relative to material addition surface 31, or tool path. The tool path may include the width of the overlap between adjacent passes of the energy beam focal spot and the build-up rate. Computing device 26 may control the at least one of these parameters to control the amount of material added to component 28 at a given time and/or to control metallurgical properties of the added material. In some examples, energy delivery head 16 may be scanned (e.g., translated) relative to material addition surface 31 of component 28 being repaired to scan the focal spot relative to material addition surface 31 of component 28 being repaired, and the material may be fused in a general shape corresponding to the scanned path of the focal spot.

System 10 also includes gas source 24. Gas source 24 may include, for example, a source of helium, argon, or other substantially inert gas. In some examples, the gas may function as a cooling gas, which cools a portion of component 28 by flowing past the portion of component 28. As used herein, a substantially inert gas may include a gas that does not react with component 28 or the material being added to component 28 during the DED MA forming or repair process. Gas source 24 is fluidically coupled to gas delivery device 20. Although FIG. 1 illustrates system 10 including a single gas delivery device 20, in other examples, system 10 may include at least one gas delivery device 20, such as a plurality of gas delivery devices. Gas source 24 may be fluidically coupled to gas delivery device 20 using a tube, pipe, conduit, or the like, that allows fluid communication between gas source 24 and gas delivery device 20.

As described above, in some examples, gas delivery device 20 may be movable relative to component 28 under control of computing device 26. This may allow computing device 26 to control delivery of gas to a selected portion of component 28 to achieve controlled cooling of the selected portion of component 28. In examples in which system 10 includes a plurality of gas delivery device 20, each outlet 20 may be independently controllable by computing device 26 to independently cool selected portions of component 28.

In some examples, system 10 also may include a material delivery device 30. Material delivery device 30 may be configured to deliver material to the location of component 28 being formed or repaired. The material then may be heated by energy delivered by energy delivery head 16 to add the material to component 28. In some examples, the material may be supplied by material delivery device 30 in powder form or wire form. In some examples, the material to be delivered to material delivery device 30 may include a composition substantially the same as (e.g., the same or nearly the same as) the composition of the material from which component 28 is formed. In other examples, the material to be delivered to material delivery device 30 may include a composition different from the composition of the material from which component 28 is formed.

As illustrated in FIG. 1, in some examples, material delivery device 30 may be mechanically attached to or integrated into energy delivery head 16. In some examples, this may facilitate coordinated positioning of energy delivery head 16 relative to the location at which material is delivered. In other examples, material delivery device 30 may be separate from energy delivery head 16.

In some examples, material delivery device 30 may deliver the material in powder form, wire form, or the like. For example, material in powder form may be blown by material delivery device 30 to deliver the material adjacent to material addition surface 31. Initially, material delivery device 30 may be positioned and configured to deliver material adjacent to material addition surface 31. Computing device 26 also may control the rate at which material is delivered by material delivery device 30 adjacent to component 28.

At least one sensor 18 may be configured to detect at least one parameter indicative of the status of component 28 during formation or repair of component 28. For example, at least one sensor 18 may monitor a characteristic of a melt pool formed during addition of the material to component 28, a geometry of component 28, or the like. The at least one sensor 18 may include, for example, a visual or thermal imaging system, a laser, sonar, probe, or the like.

In some examples, at least one sensor 18 may include a sensor for monitoring a characteristic of a melt pool formed during addition of the material to component 28. The sensor may include an imaging system, such as a visual or thermal camera, e.g., camera to visible light or infrared (IR) radiation. A visible light camera may monitor the geometry of the melt pool, e.g., a width, diameter, shape, or the like. A thermal (or IR) camera may be used to detect the size, temperature, or both of the melt pool. In some examples, a thermal camera may be used to detect the temperature of the melt pool at multiple positions within the melt pool, such as a leading edge, a center, and a trailing edge of the melt pool. In some examples, the imaging system may include a relatively high speed camera capable of capturing image data at a rate of tens or hundreds of frames per second or more, which may facilitate real-time detection of the characteristic of the melt pool.

As another example, at least one sensor 18 may include a sensor for monitoring a geometry of component 28. The sensor for monitoring the geometry of component 28 may include, for example, a visual camera, such as a high resolution vision system and/or a laser vision sensor, a sonar, a physical probe, or the like. The sensor may monitor at least one aspect of the geometry of component 28, including a geometry of a surface feature of component 28, a layer geometry of a layer being added to component 28, a distortion of the geometry of component 28 compared to a predicted or reference geometry, or the like. For example, the layer geometry may indicate overbuild (excess material added to the component compared to what is expected), underbuild (insufficient material added to the component compared to what is expected), or a correct amount of build. In some examples, the sensor for monitoring the geometry of component 28 may include a relatively high speed camera capable of capturing image data at a rate of tens or hundreds of frames per second or more, which may facilitate real-time detection of the geometry of component 28 during formation or repair of component 28.

An another example, at least one sensor 18 may include a sensor for monitoring a location of focal spot 27 of the energy beam 29 relative to material addition surface 31. For example, component 28 may distort of unexpectedly more during the DED MA processing, which may result in focal spot 27 of energy beam 29 being positioned relative to material addition surface 31 in an unexpected location. This may result in underbuild, overbuild, damage to component 28, changes to the melt pool, or the like. At least one sensor 18 for monitoring the location of focal spot 27 relative to material addition surface 31 may include an imaging system, such as a relatively high speed camera capable of capturing image data at a rate of tens or hundreds of frames per second or more, which may facilitate real-time detection of the location of focal spot 27 relative to material addition surface 31.

In some examples, at least one sensor 18 may include a microfocus x-ray sensor, which may detect flaws in component 28 (e.g., portions of the material added to component using the DED MA technique).

In some examples, at least one sensor 18 may include two or more sensors. For example, a first sensor may be positioned relative to component 28 such that the first sensor is oriented above the portion of component 28 being formed or repaired to monitor the temperature and/or geometry of the melt pool. A second sensor may be positioned relative to component 28 such that the second sensor is oriented to the side of the portion of component 28 being formed or repaired to monitor the temperature and/or geometry of component 28.

Computing device 26 may include, for example, a desktop computer, a laptop computer, a workstation, a server, a mainframe, a cloud computing system, or the like. Computing device 26 may include or may be one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality of computing device 26 may be provided within dedicated hardware and/or software modules.

Computing device 26 is configured to control operation of system 10, including, for example, stage 14, at least one sensor 18, gas delivery device 20, gas source 24, energy source 22, energy delivery head 16, and/or material delivery device 30. Computing device 26 may be communicatively coupled to at least one of stage 14, at least one sensor 18, gas delivery device 20, gas source 24, energy source 22, energy delivery head 16, and/or material delivery device 30 using respective communication connections. In some examples, the communication connections may include network links, such as Ethernet, ATM, or other network connections. Such connections may be wireless and/or wired connections. In other examples, the communication connections may include other types of device connections, such as USB, IEEE 1394, or the like.

Computing device 26 may be configured to control operation of stage 14, at least one sensor 18, energy delivery head 16, and/or gas delivery device 20 to position component 28 relative to at least one sensor 18, energy delivery head 16, and/or gas delivery device 20. For example, as described above, computing device 26 may control stage 14 at least one sensor 18, energy delivery head 16, and/or gas delivery device 20 to translate and/or rotate along at least one axis to position component 28 relative to at least one sensor 18, energy delivery head 16, and/or gas delivery device 20. Positioning component 28 relative to at least one sensor 18, energy delivery head 16, and/or gas delivery device 20 may include positioning a predetermined surface (e.g., a surface to which material is to be added) of component 28 in a predetermined orientation relative to at least one sensor 18, energy delivery head 16, and/or gas delivery device 20.

Figure 4:
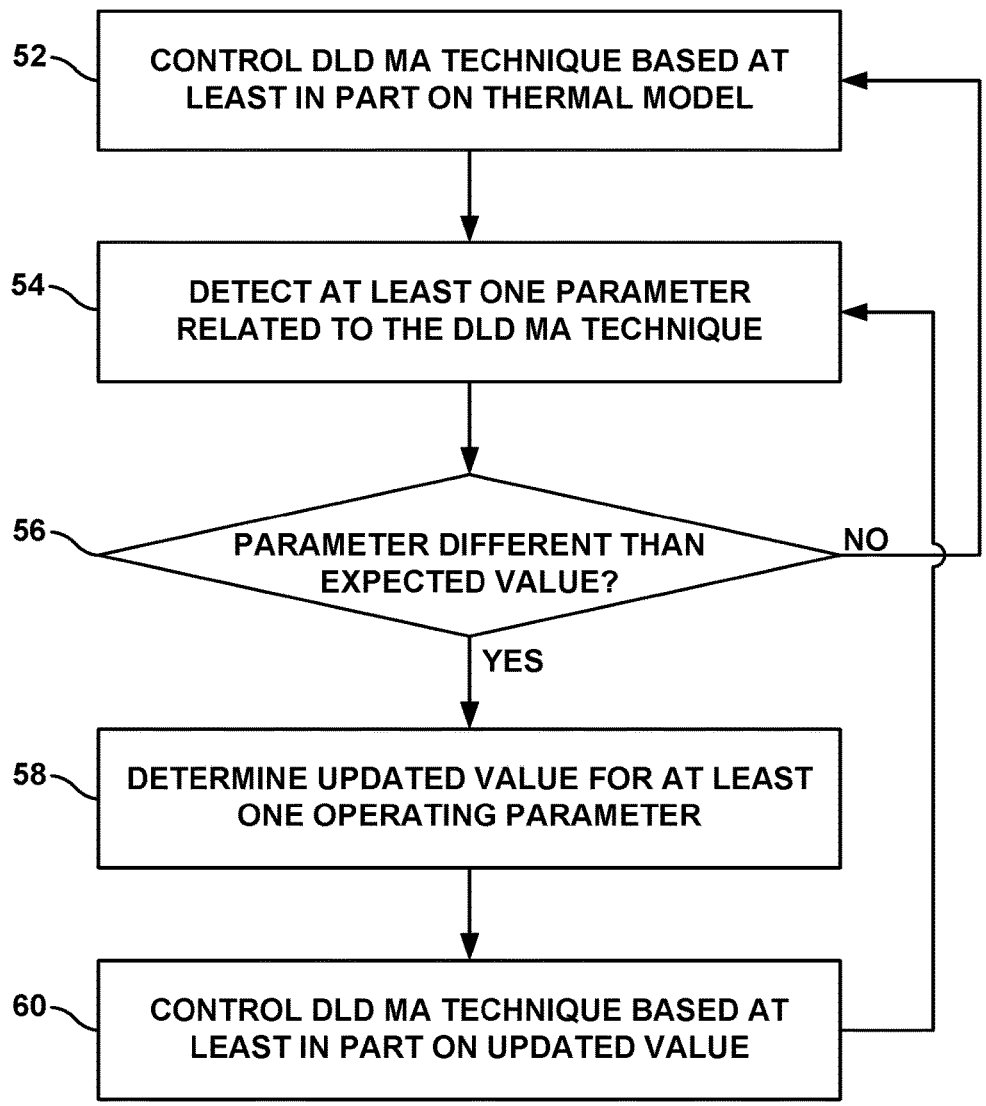
FIG. 4 is a flow diagram illustrating an example technique for controlling a directed energy deposit material addition technique based at least in part on a thermal model and a neuro-fuzzy algorithm.

In accordance with some examples of this disclosure, computing device 26 may be configured to control system 10 to form component 28 or repair of a damaged portion of component 28 using DED MA. FIG. 4 is a flow diagram illustrating an example technique for controlling a DED MA technique based at least in part on a thermal model and a neuro-fuzzy algorithm. Although the technique of FIG. 4 will be described with respect to system 10 of FIG. 1, in other examples, the technique of FIG. 4 may be performed using a different system. Additionally, system 10 and computing device 26 may perform other techniques to form component 28 or repair component 28 using DED MA.

Computing device 26 may control the DED MA techniques based in part on a thermal model (52). The thermal model may define a plurality of default operating parameters for the DED MA technique. The operating parameters may include, for example, a power level of the energy source 22; a size of focal spot 27; a rate of material delivery by material delivery device 30; relative movement of focal spot 27 relative to component 28; a pause time between delivery of bursts of energy by energy source 22; a flow rate of cooling gas from gas source 24; a position of a gas delivery device 20 relative to component 28; a standoff between focal spot 27 and material addition surface 31; a tool path followed by energy delivery head 16; an angle of energy delivery head 16 (and energy beam 29) with respect to material addition surface 31; or the like.

The thermal model may be based on properties of materials used in the DED MA technique. For example, the material from which component 28 is formed and the material delivered by material delivery device 30 may possess properties that affect aspects of the DED MA technique. The properties may include, for example, geometry, melting temperature, heat capacity, thermal conductivity, viscosity of the melt pool, and the like. Further, the thermal model may incorporate information regarding the cooling gas provided by gas source 24, the wavelength of energy provided by energy source 22, and the like. The thermal model may include theoretically determined models, experimentally determined models, or both, to predict the effect of specified values for the operating parameters on the DED MA process. Computing device 26 may utilize the thermal model and input values for the operating parameters to determine output parameters representing the behavior of component 28, the melt pool, and the material being added to component 28. In this way, computing device 26 may utilize the thermal model to determine, automatically or under supervision of a user, default or baseline operating parameters for controlling operation of system 10, including at least one of gas source 24, energy source 22, gas delivery device 20, energy delivery head 16, material delivery device 30, stage 14, or the like.

Computing device 26 also may monitor or detect at least one parameter of the DED MA technique (54), such as a parameter related to the melt pool, the geometry of component 28, or a detected defect in component 28. Computing device 26 may receive a signal indicative of the at least one parameter from at least one sensor 18 (or multiple sensors). Computing device 26 may determine whether the value of the at least one detected parameter is different than an expected value or expected range of values of the at least one parameter determined using the thermal model to determine if the DED MA process is proceeding as predicted by the thermal model (56). If computing device 26 determines that the detected value of the at least one parameter is substantially the same as (e.g., within a threshold amount of) the value predicted by the thermal model (the "NO" branch of decision block 56), computing device 26 may continue controlling the DED MA process based on the default or baseline operating parameters determined using the thermal model (52) and monitoring or detecting at least one parameter of the DED MA technique (54).

Due to the number of potential inputs to and number of potential outputs from the thermal model, and the complex relationships between the different input variables and output variable, the thermal model may be computationally intensive, such that it is not practical to rely on the thermal model for real-time control of system 10. Further, the thermal model may be inaccurate due to process variations, geometry variations, or the like. Hence, if computing device 26 determines that a value of at least one detected parameter is different than the value predicted by the thermal model (the "YES" branch of decision block 56), computing device 26 may utilize a neuro-fuzzy algorithm to determine an updated value for at least one operating parameter for the DED MA technique (58).

A neuro-fuzzy algorithm is a trainable or adaptive algorithm utilizing fuzzy rules. For example, a neuro-fuzzy algorithm may utilize at least two fuzzy if-then rules as nodes in an adaptive network (e.g., a neural network). The at least two fuzzy if-then rules may include parameters that may be determined or adjusted using a training set of inputs and desired outputs, along with a learning rule, such as a back-propagation learning rule. The back-propagation learning rule may utilize one or more error measurement comparing the desired output to the output produced by the neuro-fuzzy algorithm to train the neuro-fuzzy algorithm by varying the parameters to minimize the one or more error measurement.

Figure 5:
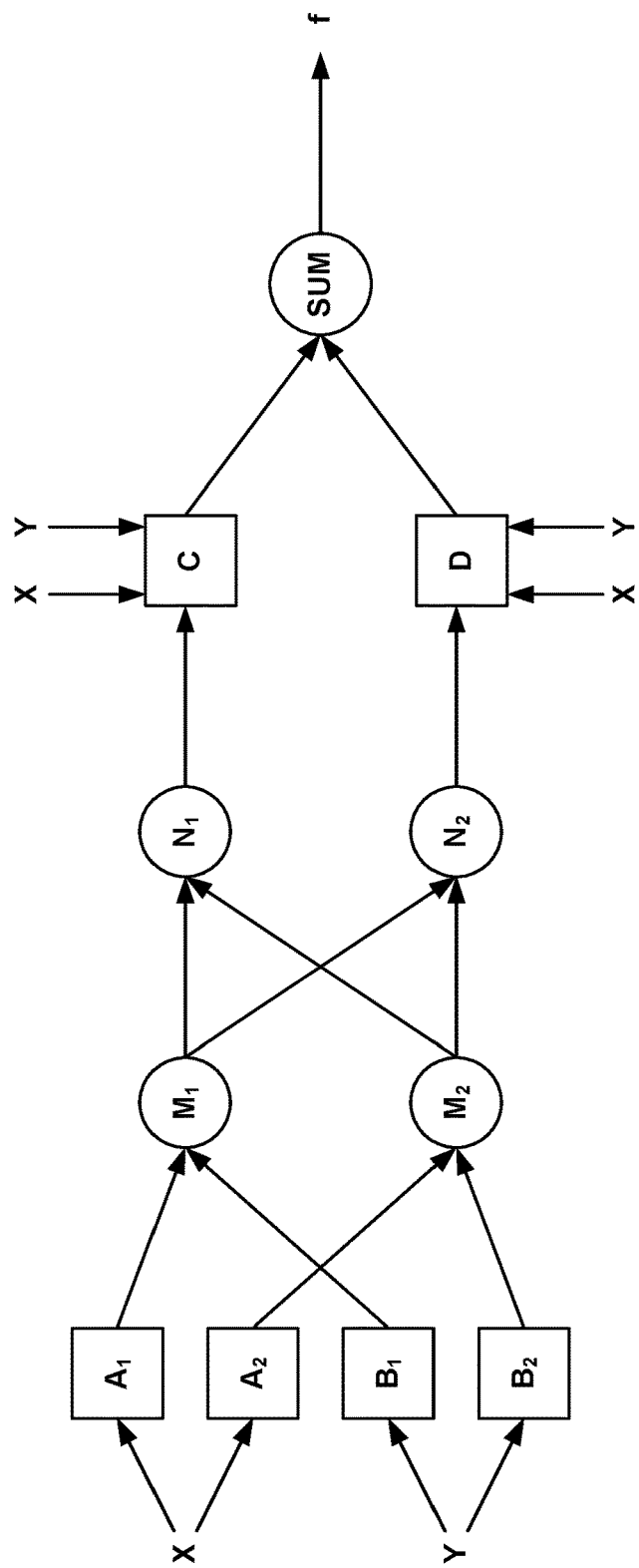
FIG. 5 is a conceptual diagram of an example neuro-fuzzy algorithm including two inputs and two fuzzy if-then rules.

As an example, a neuro-fuzzy algorithm may include two fuzzy if-then rules. FIG. 5 is a conceptual diagram of an example neuro-fuzzy algorithm including two inputs and two fuzzy if-then rules. Inputs X and Y represent two detected parameters detected by at least one sensor 18 and supplied to computing device 16. For example, X may be melt pool temperature and Y may be melt pool size. Input X is input into adaptive nodes $A_1$ and $A_2$, which are membership functions determining if input X belongs to a respective fuzzy set. Similarly, input Y is input into adaptive nodes $B_1$ and $B_2$, which are membership functions determining if input X belongs to a respective fuzzy set. The fuzzy sets correspond to respective premises of the fuzzy if-then rules. For example, membership function $A_1$ may determine if a value of X belongs to a set "melt pool is hot." As another example, a membership rule $B_1$ may determine if an input Y belongs to a set "melt pool size is normal." The output of each membership function is a membership value, which is a value between 0 and 1, indicating a likelihood that the input belongs to the respective fuzzy set.

Each of the membership functions may include at least one premise parameter, which is adjustable, and, when changed, changes the membership value for a given input X or input Y. The premise parameters may be changed as part of the learning process for the neuro-fuzzy algorithm.

In the example neuro-fuzzy algorithm shown in FIG. 5, the outputs (which are membership values) of the respective membership functions are input to a fixed node. For example, the respective membership values output by adaptive nodes $A_1$ and $B_1$ are input to fixed node $M_1$. Fixed node $M_1$ may multiply or apply a fuzzy AND operation to the inputs and output the resulting value to fixed node $N_1$ and fixed node $N_2$. Similarly, the respective membership values output by adaptive nodes $A_2$ and $B_2$ are input to fixed node $M_2$, which may multiply or apply a fuzzy AND operation to the inputs and output the resulting value to fixed node $R_1$ and fixed node $R_2$. These outputs of $M_1$ and $M_2$ are representative of a degree of fulfillment of the fuzzy rule (membership function). Fixed nodes $N_1$ and $N_2$ calculate a weighted or normalized value for each of the degrees of fulfillment and output these weighted or normalized values to adaptive node C and adaptive node D, respectively.

Adaptive node C multiplies the weighted value for the first rule (corresponding to fuzzy set $A_1$ for X and $B_1$ for Y) by a function representing the consequence of the first fuzzy if-then rule. The function representing the consequence may include one or more consequent parameters that are changeable, e.g., as part of the learning process for the neuro-fuzzy algorithm. Similarly, adaptive node D multiplies the weighted value for the first rule (corresponding to fuzzy set $A_2$ for X and $B_2$ for Y) by a function representing the consequence of the second fuzzy if-then rule. The function representing the consequence may include one or more consequent parameters that are changeable, e.g., as part of the learning process for the neuro-fuzzy algorithm.

The SUM node then sums the outputs of adaptive node C and adaptive node D to give the output of the neuro-fuzzy algorithm, which may be used by computing device 26 to control operation of system 10. By including the weighted average nodes, the neuro-fuzzy algorithm illustrated in FIG. 5 may omit defuzzification, which is used to transform the fuzzy set output by a fuzzy logic rule to a specific value.

FIG. 5 illustrates a single, example neuro-fuzzy algorithm, and computing device 26 may be configured to implement any neuro-fuzzy algorithm to determine an updated value for at least one operating parameter for the DED MA technique (58). For example, the neuro-fuzzy algorithm may include fewer or additional layers of nodes, more or fewer layers of nodes that include adaptive nodes, a defuzzification technique, more inputs, more rules, or the like.

Because at least some of the nodes in the neuro-fuzzy algorithm include parameters that may be changed, the neuro-fuzzy algorithm may be trained using a training set of data, similar to other adaptive networks, such as neural networks. The training set may include a set of input values (e.g., X and Y) and a corresponding desired output. The set of input values may be input to the neuro-fuzzy algorithm, and the output of the neuro-fuzzy algorithm may be compared to the desired output. Computing device 26 may determine an error, and adjust values of one or more parameters of one or more adaptive nodes of the neuro-fuzzy algorithm. Computing device 26 may implement any known training or learning algorithm, including, for example, a back-propagation learning rule, real time recurrent learning, or the like. In this way, the neuro-fuzzy algorithm may permit control of one more operating parameters of system 10 by computing device 26 while implementing machine learning. Further, the fuzzy if-then rules utilized by the neuro-fuzzy algorithm may be inspected by a user, allowing verification of the neuro-fuzzy algorithm.

The neuro-fuzzy algorithm may implement any one or more rules relating one or more detected parameters of the DED MA technique to one or more operating parameters. Example rules may include:

1. IF melt pool size is normal, THEN do not change power of energy source 22 OR movement speed of energy delivery head 16 relative to component 28.
2. IF melt pool size is low AND focal spot 27 is away from edge of component 28, THEN increase power of energy source 22.
3. IF melt pool size is high, THEN reduce power of energy source 22.
4. IF melt pool size is low AND focal spot 27 is near edge of component 28 AND geometry is normal, THEN do not change power of energy source 22.
5. IF melt pool size is low AND focal spot 27 is near edge of component 28 AND geometry of component 28 is low (or small), THEN increase power of energy source 22.

6. IF temperature of component 28 is high, THEN increase pause time between pulses of energy from energy source 22.
7. IF melt pool size is normal AND geometry of component 28 is low (or small), THEN reduce speed of energy delivery head 16 relative to component 28.
8. IF cooling rate of added material is low, THEN increase speed of energy delivery head 16 relative to component 28.
9. IF geometry of component 28 is low (or small), THEN increase rate of material delivery from material delivery device 30.

Once computing device 26 determines an updated value for at least one operating parameter using the neuro-fuzzy algorithm (58), computing device 26 may control system 10 (including at least one of stage 14, at least one sensor 18, gas delivery device 20, gas source 24, energy source 22, energy delivery head 16, and/or material delivery device 30) based at least in part on the updated value (60). Computing device 26 may continue to detect at least one parameter related to the DED MA technique (54) and iterating on the technique of FIG. 4.

In some examples, as shown in FIG. 4, computing device 26 may transition between controlling system 10 based at least in part on the thermal model and based at least in part on the neuro-fuzzy algorithm. For example, computing device 26 may initially control system 10 based at least in part on the thermal model (52). At least one sensor 18 may detect at least one parameter related to the DED MA technique (54), and computing device 26 may receive a signal indicative of a value of the at least one parameter. Computing device 26 then may determine whether the value of the at least one detected parameter is different than an expected value of the at least one parameter (56). Responsive to determining that the value of the at least one detected parameter is different than the expected value, computing device 26 may utilize the neuro-fuzzy algorithm to determine an updated value for the at least one operating parameter (58) and control system 10 based at least in part on the updated value for the at least one operating parameter (60).

After computing device 26 controls system 10 based at least in part on the updated value for the at least one operating parameter (60), at least one sensor 18 may continue to detect at least one parameter at least one parameter related to the DED MA technique (54), and computing device 26 may receive a signal indicative of a value of the at least one parameter. Computing device may determine whether the value of the at least one detected parameter is different than an expected value of the at least one parameter (56). Responsive to determining that that the value of the at least one detected parameter is not different than the expected value, computing device 26 may control system 10 based at least in part on the thermal model (52). As an example, computing device 26 may control system 10 based at least in part on the neuro-fuzzy algorithm to maintain a consistent size of the melt pool in the center of the material addition surface 31, but when approaching an edge of material addition surface, may transition to controlling system based at least in part on the thermal model.

In one or more examples, the functions described herein may be implemented in hardware, software, firmware, or any combination thereof. If implemented in software, the functions may be stored on or transmitted over, as one or more instructions or code, a computer-readable medium or computer-readable storage device and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media or computer-readable storage device, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, include compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
controlling, by a computing device, a directed energy deposition material addition (DED MA) technique based at least in part on a thermal model of the DED MA technique for a component, wherein the thermal model defines a plurality of default operating parameters for the DED MA technique;
detecting, by at least one sensor comprising a thermal camera, at least one parameter comprising at least one of a melt pool geometry, a melt pool temperature, or a temperature of the component;
responsive to determining, by the computing device, that a value of the at least one detected parameter is different from an expected value of a corresponding parameter predicted by the thermal model, determining, by the computing device and using a neuro-fuzzy algorithm, an updated value for at least one operating parameter for the DED MA technique, wherein the neuro-fuzzy algorithm includes at least two fuzzy nodes in an adaptive network; and
controlling, by the computing device, the DED MA technique based at least in part on the updated value for the at least one operating parameter.

2. The method of claim 1, wherein the plurality of default operating parameters comprise at least one of:
a power level of the energy source;
a focal spot size of an energy beam delivered adjacent to a surface of the component;
a material delivery rate;
relative movement of a focal spot of the energy beam relative to the component;
a pause time between bursts of energy;
a flow rate of gas adjacent to the component;
a position of a gas delivery device relative to the component;
an angle of an energy delivery head relative to the component;
a standoff between the focal spot and the surface of the component; or
a tool path followed by the energy delivery head.

3. The method of claim 1, wherein the at least one detected parameter further comprises at least one of a geometry of the component, a surface feature geometry, or a presence of a defect.

4. The method of claim 1, wherein the component comprises at least one of a gas turbine engine blade, a gas turbine engine blisk, or a gas turbine engine blisk drum.

5. The method of claim 1, further comprising:
inputting a set of inputs from a training set to the neuro-fuzzy algorithm, wherein the at least two fuzzy nodes include node parameters;
evaluating outputs of the neuro-fuzzy algorithm against outputs of the training set; and
modifying at least one of the node parameters based on the evaluation of the outputs of the neuro-fuzzy algorithm.

6. A directed energy deposition material addition (DED MA) system comprising:
a material delivery device;
an energy source;
an energy delivery head;
at least one sensor comprising a thermal camera; and
a computing device, wherein the computing device is configured to:
control at least one of the material delivery device, the energy source, and the energy delivery head based at least in part on a thermal model of the DED MA technique for a component, wherein the thermal model defines a plurality of default operating parameters for the DED MA technique;
receive, from the at least one sensor comprising the thermal camera, a signal indicative of at least one parameter comprising at least one of a melt pool geometry, a melt pool temperature, or a temperature of a component;
responsive to determining that a value of the at least one detected parameter is different from an expected value of a corresponding parameter predicted by the thermal model, determine, using a neuro-fuzzy algorithm, an updated value for at least one operating parameter for the DED MA technique, wherein the neuro-fuzzy algorithm includes at least two fuzzy nodes in an adaptive network; and
control at least one of the material delivery device, the energy source, and the energy delivery head based at least in part on the updated value for the at least one operating parameter.

7. The DED MA system of claim 6, wherein the plurality of default operating parameters comprise at least one of:
a power level of the energy source;
a focal spot size of an energy beam delivered by the energy delivery head adjacent to a surface of the component;
a rate at which the material delivery device delivers material;
relative movement of the energy delivery head relative to the component;
a pause time between bursts of energy generated by the energy source;
an angle of the energy delivery head relative to the component;
a standoff between the energy delivery head and the surface of the component; or
a tool path followed by an energy delivery head.

8. The DED MA system of claim 6, further comprising a gas delivery device, and wherein the plurality of default operating parameters comprise at least one of
a flow rate of gas adjacent to the component; or
a position of a gas delivery device relative to the component.

9. The DED MA system of claim 6, wherein the at least one detected parameter further comprises at least one of a geometry of the component a surface feature geometry, or a presence of a defect.

10. The DED MA system of claim 6, wherein the component comprises at least one of a gas turbine engine blade, a gas turbine engine blisk, or a gas turbine engine blisk drum.

11. The DED MA system of claim 6, wherein the computing device is further configured to:
receive a set of inputs from a training set to the neuro-fuzzy algorithm, wherein the at least two fuzzy nodes include node parameters;
evaluate outputs of the neuro-fuzzy algorithm against outputs of the training set; and
modify at least one of the node parameters based on the evaluation of the outputs of the neuro-fuzzy algorithm.

12. A non-transitory computer-readable storage medium comprising instructions that, when executed, cause at least one processor to:
control a directed energy deposition material addition (DED MA) technique based at least in part on a thermal model of the DED MA technique for a component, wherein the thermal model defines a plurality of default operating parameters for the DED MA technique;

receive, from at least one sensor comprising a thermal camera, a signal indicative of at least one parameter comprising at least one of a melt pool geometry, a melt pool temperature, or a temperature of a component;

responsive to determining that a value of the at least one detected parameter is different from an expected value of a corresponding parameter predicted by the thermal model, determine, using a neuro-fuzzy algorithm including at least two fuzzy nodes in an adaptive network, an updated value for at least one operating parameter for the DED MA technique; and control the DED MA technique based at least in part on the updated value for the at least one operating parameter.

13. The non-transitory computer-readable storage medium of claim 12, wherein the plurality of default operating parameters comprise at least one of:

a power level of the energy source;

a focal spot size of an energy beam delivered adjacent to a surface of the component;

a material delivery rate;

relative movement of a focal spot of the energy beam relative to the component;

a pause time between bursts of energy;

a flow rate of gas adjacent to the component;

a position of a gas delivery device relative to the component;

an angle of an energy delivery head relative to the component;

a standoff between the focal spot and the surface of the component; or a tool path followed by an energy delivery head.

14. The non-transitory computer-readable storage medium of claim 12, wherein the at least one detected parameter further comprises at least one of a geometry of the component, a melt pool geometry, a melt pool temperature, a surface feature geometry, a presence of a defect, or a temperature of the component.

15. The non-transitory computer-readable storage medium of claim 12, wherein the component comprises at least one of a gas turbine engine blade, a gas turbine engine blisk, or a gas turbine engine blisk drum.

16. The non-transitory computer-readable storage medium of claim 12, further comprising instructions that, when executed, cause the at least one processor to:

receive a set of inputs from a training set to the neuro-fuzzy algorithm, wherein the at least two fuzzy nodes include node parameters;

evaluate outputs of the neuro-fuzzy algorithm against outputs of the training set; and modify at least one of the node parameters based on the evaluation of the outputs of the neuro-fuzzy algorithm.

* * * * *